(12) United States Patent
Wang et al.

(10) Patent No.: US 7,293,747 B2
(45) Date of Patent: Nov. 13, 2007

(54) DISPLAY MOVEABLE IN TWO DIMENSIONS

(75) Inventors: Beniz Wang, Banciao (TW); Yu-Chi Lin, Sinjhuang (TW)

(73) Assignee: Inventec Corporation, Taipei (TW)

( * ) Notice: Subject to any disclaimer, the term of this patent is extended or adjusted under 35 U.S.C. 154(b) by 2 days.

(21) Appl. No.: 11/196,467

(22) Filed: Aug. 3, 2005

(65) Prior Publication Data

US 2007/0029458 A1 Feb. 8, 2007

(51) Int. Cl.
*A47F 5/00* (2006.01)

(52) U.S. Cl. .................... 248/125.2; 248/920

(58) Field of Classification Search ............... 248/919, 248/921, 922, 923, 924, 454, 920, 455, 917, 248/125.2; 40/753, 748
See application file for complete search history.

(56) References Cited

U.S. PATENT DOCUMENTS

| | | | | |
|---|---|---|---|---|
| 721,245 A * | 2/1903 | Simon | ........................ | 248/454 |
| 1,334,780 A * | 3/1920 | David | ........................ | 40/795 |
| 1,414,351 A * | 5/1922 | Lewis | ........................ | 248/473 |
| 1,767,950 A * | 6/1930 | Westbrook | ................ | 248/454 |
| 3,358,957 A * | 12/1967 | Lindenmuth | ............ | 248/279.1 |
| 4,516,751 A * | 5/1985 | Westbrook | ............... | 248/279.1 |
| 4,546,948 A * | 10/1985 | Ferrara | ...................... | 248/454 |
| 4,616,218 A * | 10/1986 | Bailey et al. | ............... | 361/682 |
| 5,007,608 A * | 4/1991 | Carroll, Jr. | ............. | 248/297.21 |
| 5,209,448 A * | 5/1993 | Hatanaka et al. | ........... | 248/455 |
| 5,276,589 A * | 1/1994 | Bartlett et al. | .............. | 361/681 |
| 5,484,124 A * | 1/1996 | Billings | ...................... | 248/118 |
| 5,791,623 A * | 8/1998 | Louridas | ..................... | 248/451 |
| 6,233,138 B1* | 5/2001 | Osgood | ...................... | 361/681 |
| 6,464,195 B1* | 10/2002 | Hildebrandt | ................ | 248/460 |
| 6,504,707 B2* | 1/2003 | Agata et al. | ................ | 361/681 |
| 6,708,940 B2* | 3/2004 | Ligertwood | ................. | 248/324 |
| 6,827,409 B2* | 12/2004 | Michael | ................... | 312/223.3 |
| 7,036,787 B1* | 5/2006 | Lin | ............................ | 248/676 |
| 7,068,497 B2* | 6/2006 | Chu | .......................... | 361/681 |
| 7,090,186 B2* | 8/2006 | Quinno et al. | ............. | 248/324 |
| 2004/0011932 A1* | 1/2004 | Duff | ........................... | 248/157 |
| 2004/0056161 A1* | 3/2004 | Ishizaki et al. | .......... | 248/176.3 |
| 2004/0125549 A1* | 7/2004 | Iredale | ....................... | 361/681 |
| 2005/0224682 A1* | 10/2005 | Ishizaki et al. | ............ | 248/455 |
| 2005/0258334 A1* | 11/2005 | Hwang et al. | .............. | 248/920 |
| 2005/0270732 A1* | 12/2005 | Titzler et al. | ............... | 361/681 |
| 2006/0118686 A1* | 6/2006 | Hsieh et al. | ............. | 248/276.1 |

* cited by examiner

*Primary Examiner*—Ramon O Ramirez
*Assistant Examiner*—Bradley H Duckworth
(74) *Attorney, Agent, or Firm*—Apex Juris, pllc; Tracy M. Heims

(57) ABSTRACT

A display movable in two dimensions is disclosed, comprising a base having a track, a sliding member having a frame for supporting a display panel, a sliding bump disposed slidably in said track and on which said frame is connected pivotally and swings in a direction, and a pair of dampers disposed between the sliding member and the base. As such, a longitudinal position and a pitch angle of the display may be adjusted by moving the display in a longitudinal direction and swinging the display in a user's view direction.

8 Claims, 5 Drawing Sheets

DISPLAY MOVEABLE IN TWO DIMENSIONS

BACKGROUND OF THE INVENTION

1. Field of the Invention

The present invention relates to a carrier of a display panel, and particularly to a display having a display panel movable thereon in two dimensions.

2. Description of Related Art

For a general flat display panel, a display, a frame supporting the display panel and a base supporting the frame for placement of the display panel on a desk.

However, since the display is placed on a desk, position of the display in altitude with respect to that of eyes of a user should be carefully considered, the related vertical position of the display and the user's eye being dependent on specifications of the desk, a chair on which the user sits and the user's stature. For this reason, the frame and the base are generally pivotally connected so that the frame over the base may be adjusted in its pitch angle with a considerable range allowed. As such, the display may be used in a convenient and comfortable manner.

Although the above mentioned display may be practicable by means of adjustability of the pitch angle of the display, it may not provide commensurate comfortability by only the provision of the presentation angle when the display is placed on desks of different altitudes, respectively for a same user, or when the display is used with users of different statures, respectively, with a same desk supporting the display

SUMMARY OF THE INVENTION

It is, therefore, an object of the present invention to provide a display movable in two dimensions so that a user of different statures may see the display at a proper angle even if a platform, on which the display is placed, is different in altitude.

It is another object of the present invention to provide a display movable in two dimensions where a longitudinal position and a pitch angle of the display may be adjusted by moving the display in a longitudinal direction and swinging the display in a user's view direction.

To achieve the above objects, the display movable in two dimensions according to the present invention comprises a base having a track extending in a predetermined direction with a proper length, a sliding member having a frame for supporting a display panel, a sliding bump disposed slidably in said track and on which said frame is connected pivotally and swings in a predetermined direction and a damper disposed between a predetermined portion of said sliding member and a predetermined portion of said base.

To enable technical features of the display movable in two dimensions of the present invention to be apparent to those skilled in the art, the present invention will be specifically described below in conjunction with the accompanying drawings.

BRIEF DESCRIPTION OF THE DRAWINGS

The accompanying drawings, which are incorporated into and constitute a part of this specification, illustrate embodiments of the present invention and, together with the detailed description, serve to explain the principles and implementations of the invention. The figures are not to scale. In the drawings.

DETAILED DESCRIPTION OF THE INVENTION

Figure 1:
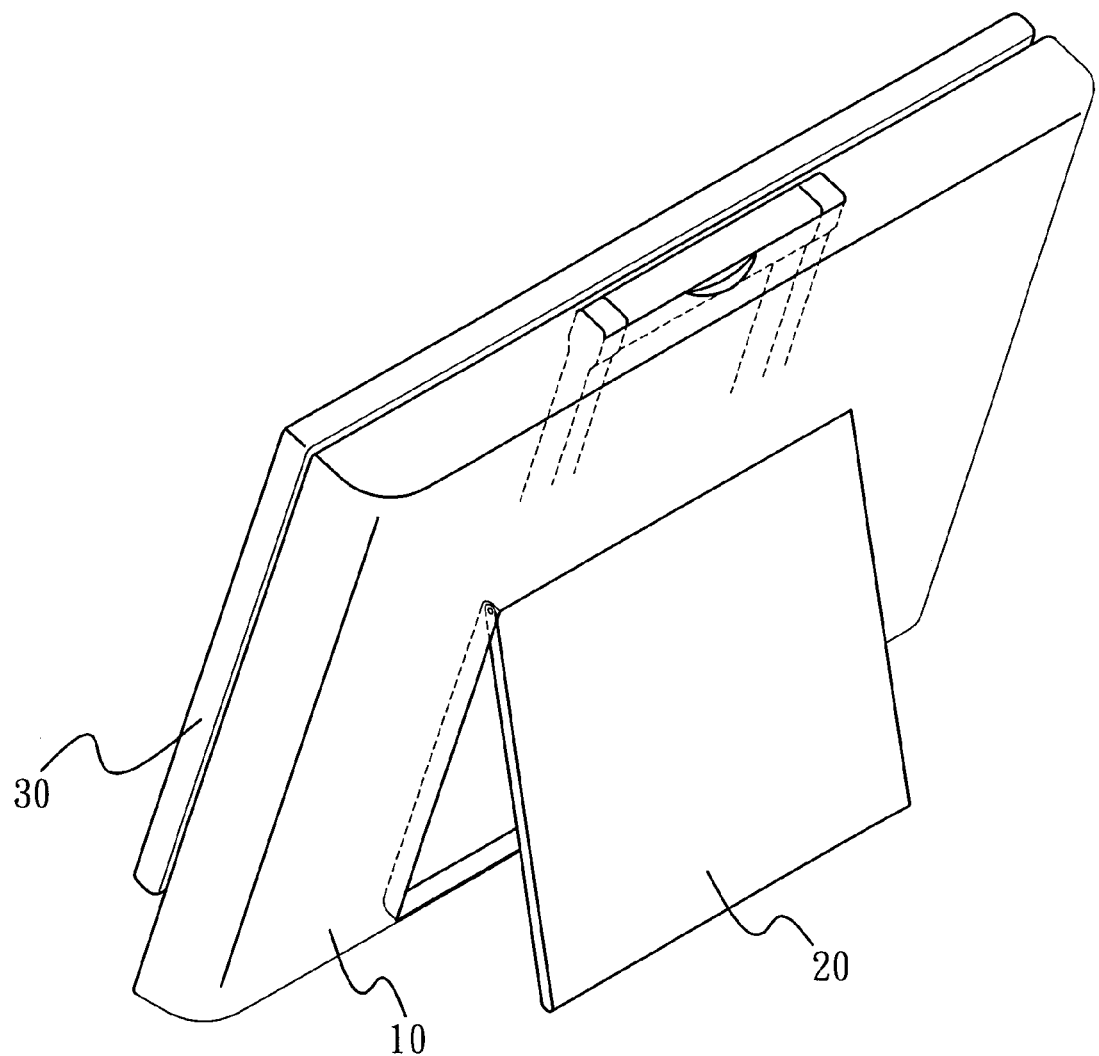
FIG. 1 is a perspective view of a display movable in two dimensions according to a preferred embodiment of the present invention.
Figure 2:
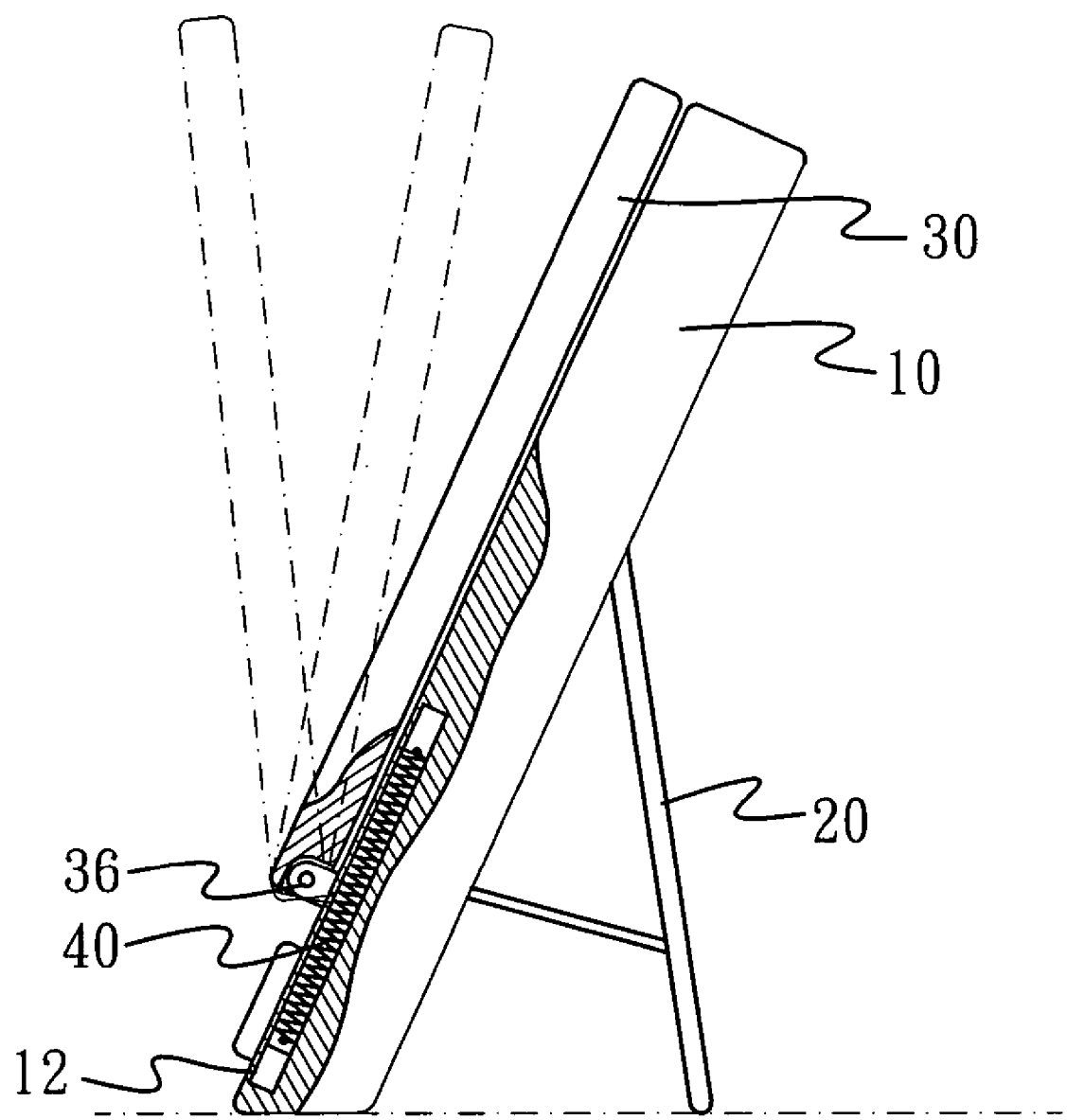
FIG. 2 is a side view of the display movable in two dimensions, in which a frame swings in a user's view direction, according to a preferred embodiment of the present invention.
Figure 3:
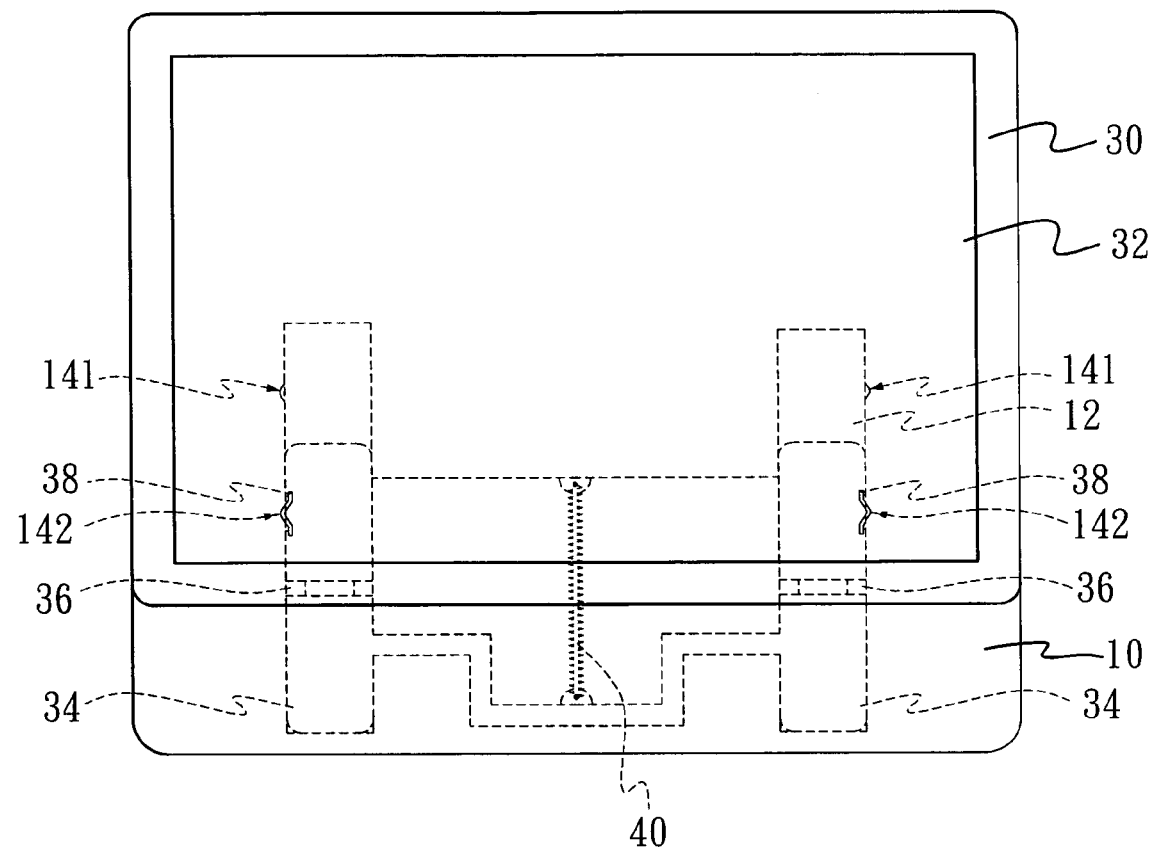
FIG. 3 is a front view of the display movable in two dimensions, in which the frame is being lowered according to a preferred embodiment of the present invention.

The display movable in two dimensions according to the present invention will be described with reference to the drawings (FIG. 1 through FIG. 5). The display movable in two dimensions comprises a base 10 through which the display may be placed on a desk and a frame 30 for supporting the display. The base 10 is in a rectangle shape and has a proper thickness. A mounting 20 is connected pivotally at a central region of a rear side of the base 10 at its upper side. A track 12, being slightly in an "H" shape and having a proper width and a proper length, is disposed inside of a front side of the base 10. Further, the track 12 is a concave groove track extending longitudinally and having a proper length. Two pairs of indentations 141, 142 are disposed on interior walls at a left side and a right side of the track 12 and separated longitudinally with a proper distance from each other.

The frame 30 is also in a rectangular shape and disposed in front of the base 10. A display panel 32 is disposed at a central region of the frame 30. A sliding bump 34, being slightly in an "H" shape, is embedded and movable longitudinally on the track 12. Two pairs of lobes 36, a proper distance separated traversely from each other, are disposed at two sides of the sliding bump 34, respectively. Further, the two pairs lobs 36 correspond to two portions at a lower rim of the rear side of the frame 30 and the two portions are pivotally disposed between the two pairs of lobes 36. Each of a pair of dampers 38 is a leaf spring which may slightly protrude outward and disposed at two sides of the sliding bump 34, respectively. A spring 40 is fixed on a lower rim of the sliding bump 34 at one end and fixed on an upper rim of interior walls of the track 12 at the other end.

Figure 4:
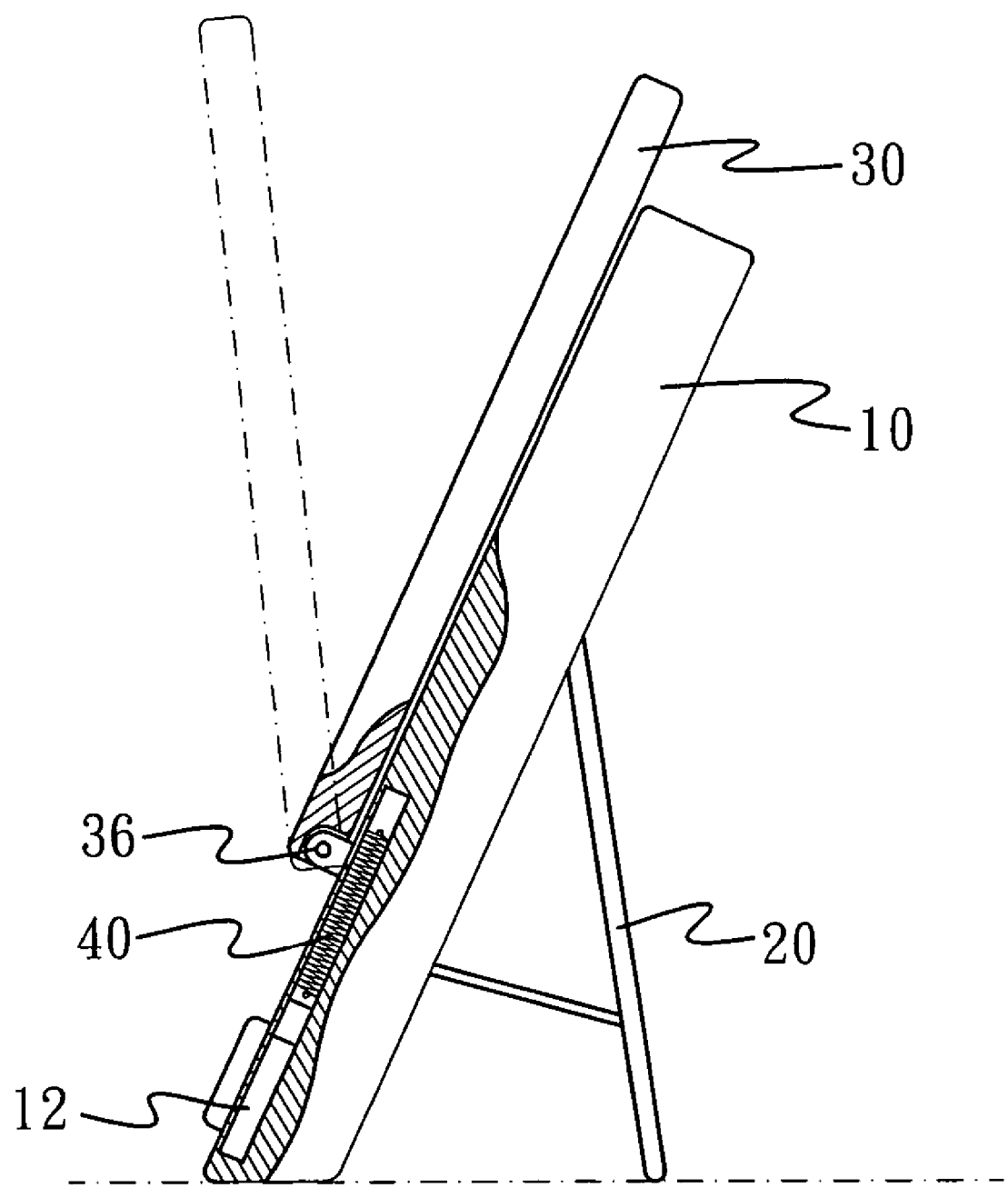
FIG. 4 is a side view of the display movable in two dimensions, in which the frame is showed in a longitudinally movable state, according to a preferred embodiment of the present invention.
Figure 5:
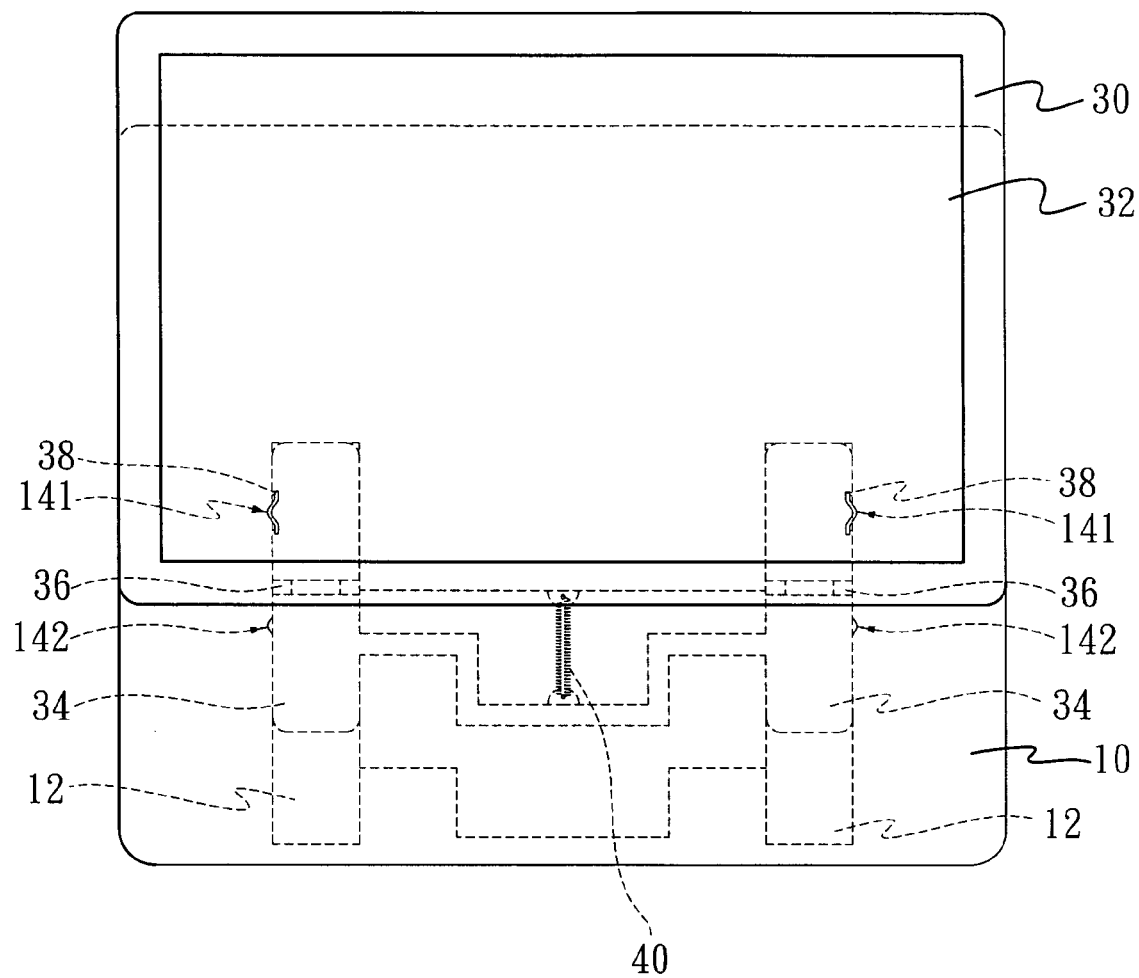
FIG. 5 shows a front view of the display movable in two dimensions, in which the frame is being elevated, according to a preferred embodiment of the present invention.

By means of the cooperation of the above elements, the frame 30 may be freely moved in a longitudinal direction through the sliding bump 34 on a front side of the base 10 between a lower position (shown in FIG. 2 and FIG. 3) and an elevated position (shown in FIG. 4 and FIG. 5). In addition, regardless of the situations where the frame 30 is located at the lowered position or the elevated position, the frame 30 may freely swing in a front and back direction relative to the user about an axis of the lobes 36 (shown in FIG. 2 and FIG. 4). As such, such a display may advantageously provide an optimal operating environment and an optimal viewing angle.

The pair of dampers 38 has functioned to enable the frame 30 to be firmly positioned with cooperation of the pair of indentations 141, 142 at either the elevated position or the lower position. In addition, because the tension force exerted by the pair of dampers 30 on the interior walls of the track 12, the frame 30 may be positioned at a specified height between the elevated position and the lower position. Further, during the upward moving of the frame 30, the spring 40 may provide a proper elastic force to a user for easily adjusting height of the frame 30.

The above described structure and operation are merely a preferred embodiment of the present invention, but not intended to exclude usability of other equivalent technologies. For example, the concave shape track 12 may be replaced by a protruded track. Alternatively, the base used to be placed on a desk in one embodiment and the sliding bump 34 movable along the track can be placed on a notebook computer in another embodiment.

The preferred embodiment of the invention has been thus described as above. However, it is merely a practicable form but not intended to limit scope of the present invention. This invention may be presented with other embodiments and forms, which may be deduced through the above disclosure. Such modification and variation should be deemed within the scope of the present invention which is recited in the appended claims.

What is claimed is:

1. A display movable in two dimensions, comprising:
a base having a track extending on said base in a predetermined length along a predetermined direction;
a sliding member having a frame for supporting a display panel and a sliding bump slidable in said track and on which said frame is connected pivotally and swing in a direction and a pair of dampers disposed between said sliding member and said base, wherein a pair of lobes is disposed on said sliding bump so that a corresponding portion of said frame is connected pivotally between said pair of lobes so as to let said frame swing in a user's view direction about an axis of said pair of lobes respectively;
a spring connected to said base at one end and said sliding member at the other end,
a mounting disposed on a rear side of said base wherein said mounting is connected pivotally to the rear side of said base at an upper end.

2. The display according to claim 1,
wherein said track is in a groove shape.

3. The display according to claim 1,
wherein said dampers are disposed between said sliding bump and said track.

4. The display according to claim 1,
wherein said track is a concave groove track for accommodating of said sliding bump and each of said pair of dampers is a leaf spring fixed on said sliding bump and a portion of said leaf spring is against interior walls of said track.

5. The display according to claim 4,
wherein said track has at least an indentation for said portion of said leaf spring to be engaged into said indentation.

6. The display according to claim 1,
wherein the pair of the lobes are located at a bottom of the frame.

7. A display movable in two dimensions, comprising:
a base having a track extending on said base in a predetermined length along a predetermined direction;
a sliding member having a frame for supporting a display panel, a sliding bump disposed slidably in said track, and on which said frame is connected pivotally and swings in a direction and a pair of dampers disposed between said sliding member and said base, wherein a pair of lobes is disposed on said sliding bump so that a corresponding portion of said frame is connected pivotally between said pair of lobes so as to let said frame swing in a user's view direction about an axis of said pair of lobes respectively;
a mounting is disposed on a rear side of said base, wherein said mounting is connected pivotally to the rear side of said base at an upper end; and
a spring connected to said base at one end and said sliding member at the other end;
wherein said track is a concave groove track for accommodating of said sliding bump and each of said pair of dampers is a leaf spring fixed on said sliding bump and a portion of said leaf spring is against interior walls of said track, and said track has at least an indentation for said portion of said leaf spring to be engaged into said indentation.

8. The display according to claim 7,
wherein the pair of the lobes are located at a bottom of the frame.

* * * * *